United States Patent [19]

Sbaschnigg et al.

[11] Patent Number: 4,936,118
[45] Date of Patent: Jun. 26, 1990

[54] MATERIAL PROCESSING SYSTEM

[75] Inventors: Johann Sbaschnigg; Franz Resch, both of Graz, Austria

[73] Assignee: Maschinenfabrik Andritz Actiengesellschaft, Graz, Austria

[21] Appl. No.: 199,240
[22] PCT Filed: Sep. 16, 1987
[86] PCT No.: PCT/AT87/00053
 § 371 Date: Jul. 13, 1988
 § 102(e) Date: Jul. 13, 1988
[87] PCT Pub. No.: WO88/02045
 PCT Pub. Date: Mar. 24, 1988

[30] Foreign Application Priority Data

Sep. 17, 1986 [AT] Austria ............................. 2488/86

[51] Int. Cl.$^5$ .............................................. D06B 5/08
[52] U.S. Cl. .......................................... 68/9; 68/22 R; 68/44; 68/181 R; 68/200
[58] Field of Search .................. 8/156; 68/9, 22 R, 27, 68/44, 62, 158, 181 R, 200

[56] References Cited

U.S. PATENT DOCUMENTS

| 1,185,766 | 6/1916 | Brunger ..................................... 68/44 |
| 1,794,039 | 2/1931 | Silvano et al. ..................... 68/200 X |
| 2,356,285 | 8/1944 | Street . | |
| 4,324,116 | 4/1982 | Davis ............................ 68/181 R X |

FOREIGN PATENT DOCUMENTS

| 1924693 | 11/1969 | Fed. Rep. of Germany . |
| 1801906 | 4/1970 | Fed. Rep. of Germany . |
| 2365068 | 7/1974 | Fed. Rep. of Germany . |
| 3423701 | 3/1985 | Fed. Rep. of Germany . |
| 00309 | 6/1979 | PCT Int'l Appl. . |
| 2115714 | 9/1983 | United Kingdom . |

Primary Examiner—Philip R. Coe
Attorney, Agent, or Firm—Townsend and Townsend

[57] ABSTRACT

The invention relates to an apparatus or device for the treatment of a material, in particular a web of material or pulp, made to pass between at least two endless permeable belts, for instance screen belts or the like conveying means, preferably for the displacement washing of a filter cake or for washing fibrous matter, the material being passed between the belts along at least two containers serving for the supply of a treatment medium, for instance a washing fluid, a bleaching agent or other chemicals. It is the object of the invention to provide a compact apparatus of this type at simultaneous good effectiveness. This object is achieved according to the invention by passing the belts with the material lodged therebetween, in particular for a countercurrent treatment, preferably for a countercurrent displacement washing, first through one or several zone(s) in which pressurized treatment fluid is fed from the top to the belts and the material from pressurized containers with one or more wall portion(s), in particular bottom(s), provided with openings and contacting the upper belt, in which zones there is essentially normal air pressure or atmospheric pressure or environmental pressure underneath the lower belt and subsequently through straining zones formed by pressing reversing rollers, compression rollers, press nips or the like arranged spacially from the pressurized containers and supported separately from these.

25 Claims, 2 Drawing Sheets

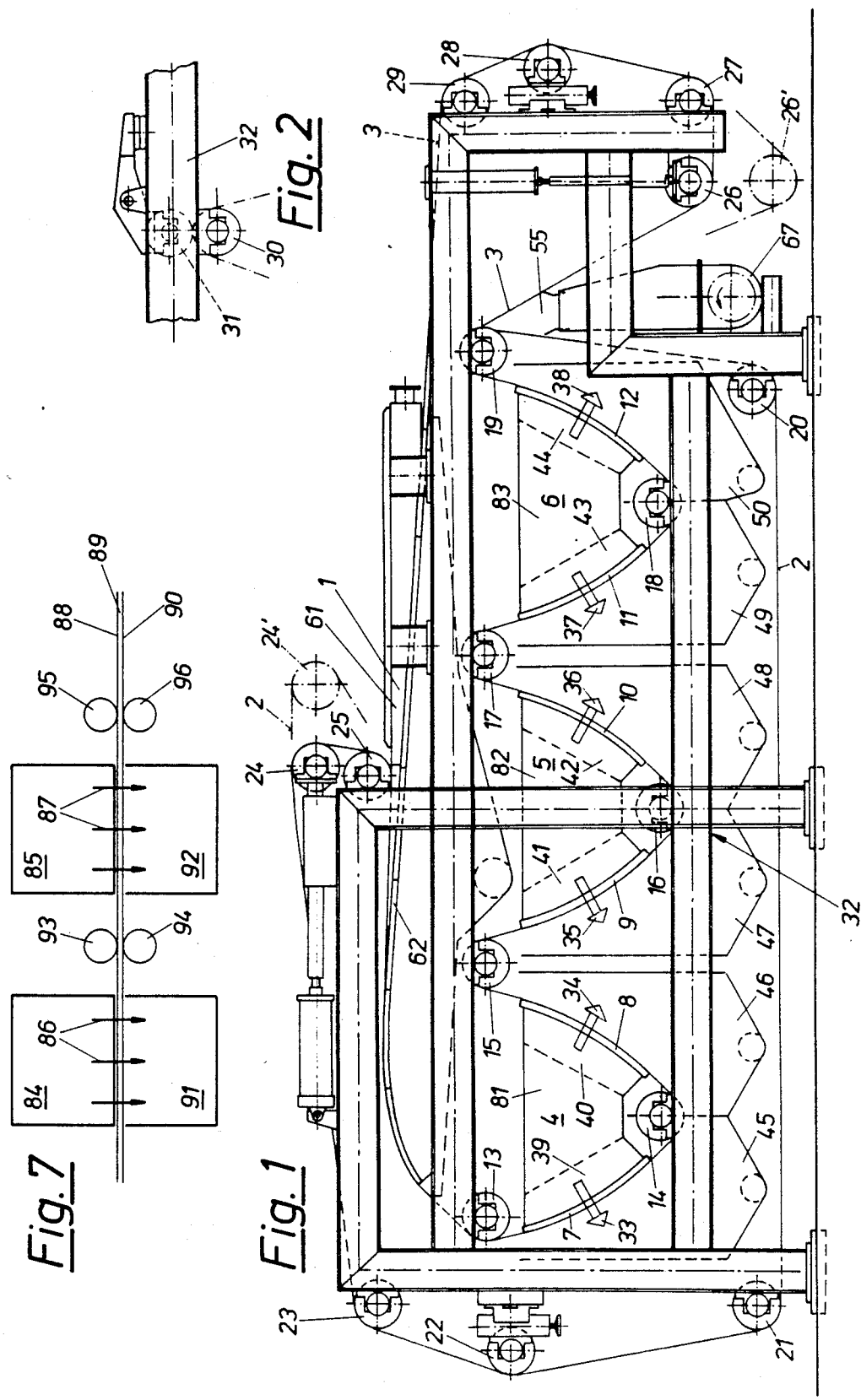

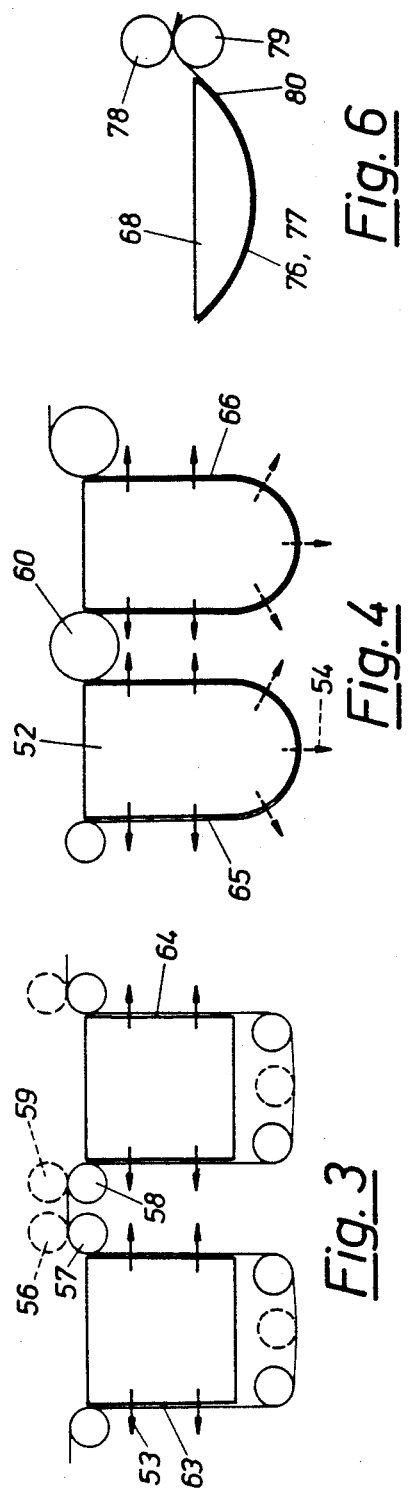
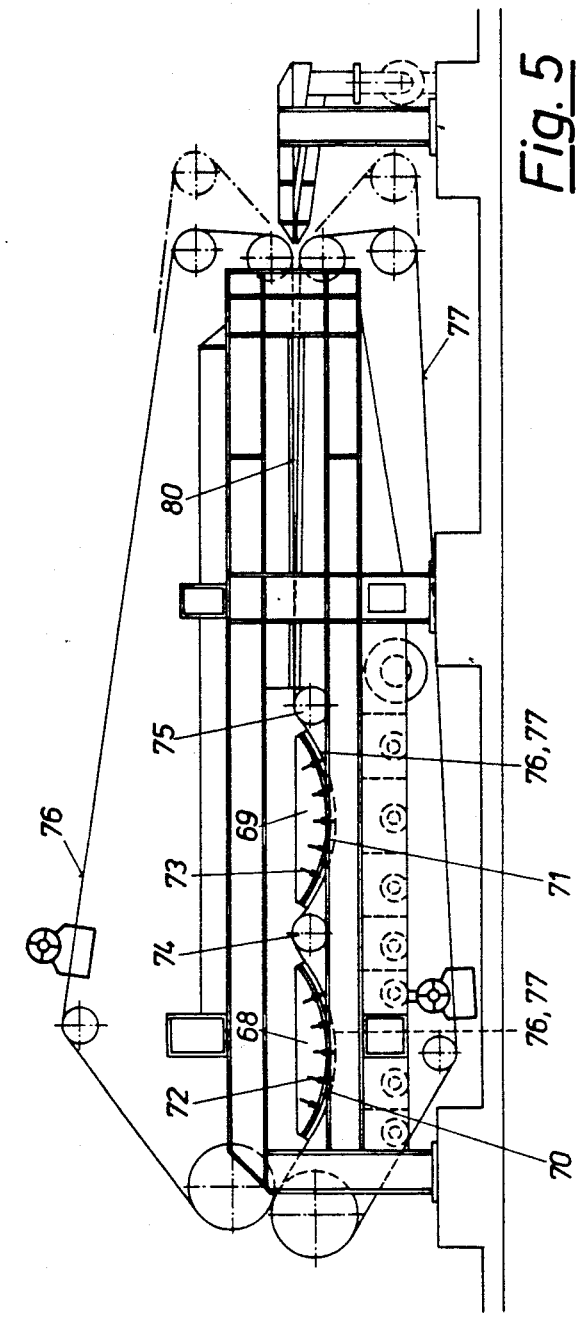

MATERIAL PROCESSING SYSTEM

Suject of the invention is an apparatus or device for treating material, in particular a web of said material or matter, carried between at least two endless premeable belts, for instance screen belts or the like transport means, preferably for displacement washing of a filter cake or for washing fibrous materials, in which the material is carried between said belts, in particular after passing a pressure zone, preferably a wedge-like compression zone, along at least two containers, being in particular arranged at the same height each one after the other as viewed in the direction of movement of said belts, in a distance from each other and above the said belts and serving for supplying a treatment medium, e.g. a washing fluid, a bleaching agent or other chemicals, wherein the said material is guided onto a compression roller or like device being arranged between the said containers after having passed individual containers and wherein the said containers may be arranged in series and may be connected with supply and withdraw lines for various treatment media, e.g. water and/or bleaching chemicals that may be moved according to various parameters or conditions, e.g. varying concentration or varying pressure.

It is common to wash cellulosic pulp and semi-pulp on rotary drum washers and flat Fourdrinier-type "long screen" washers. It is a disadvantage of these systems that with rotary drum washers, several of these must be arranged in series and the "long-screen" washers are bulky. Both systems use vacuum or compressed air necessitating high installation investments and causing high energy consumption in use. The washing performance is rather good, but due to the dilution factor that is e.g. within range of from 1 to 3,5, the fresh water need for the washing is relatively high. The said systems use displacement washihg zones connected in series and being run using a counter-current. Even gravity washers have been suggested yet. Even with the apparatus for washing cellulosic pulp as disclosed in the U.S. Pat. No. 2,356,285, vacuum is applied on the lower part of the belt. This is highly energy-consuming and necessitates costly apparative provisions as special seals must be provided at said lower face of the belt. This apparatus appears the more complicated by the fact that the washing fluid containers being arranged above the said screen belts are bottomless, so that special seals must be provided also with regard to the upper belt.

The invention offers, among other advantages, a far-reaching remedy for the above drawbacks, in that, particularly for the purpose of countercurrent treatment, preferably countercurrent displacement washing, the said belts carrying between themselves the said material are moved through at least one zone in which treatment fluid under pressure is conveyed from above to said belts and the material from pressurized containers having one or more wall portions—particularly its bottom portions—with openings and contacting the said upper belt, in which below the said lower belt there is substantially normal, atmospheric or environmental pressure, and in which they are after that moved through straining zones formed by pressing guiding rollers, compression rollers, press nips or the like arranged spaced apart and supported independently from said pressurized containers, wherein advantageously the said belts carrying the said material are also contacting said wall portions of at least one pressurized container having openings.

By the inventive feature to build up the necessary difference in pressure by suppling the treatment fluid from above under pressure (pressurized containers) and providing for atmospheric pressure below the said belts, and by bottom portions or the like in said pressurized containers arranged above the belts and only having openings for conveying the treatment fluid to the belts and the material in between so that the said pressure difference can be maintained, all the above drawbacks of the apparatus according to U.S. Pat. No. 2,356,285 are obviated. An additional advantage of the apparatus according to the invention is that said pressurized containers and said pressing devices are supported independently in contrast to the U.S. Pat. No. 2,356,285 where the said containers are supported on compression rollers. In contrast to this known embodiment, the treatment containers according to the invention can be adjusted independently of the compression rollers in location or position in relation to the belts, while the said known device provides for a fixed coupling. According to the invention, a better and more independent metering of the treatment and the displacement washing or pressing of the material is made possible, so that very good treatment results at comparatively short plant construction lengths are obtainable. The results can be further improved if—as a factulative feature—the belts are contact lateral walls of the pressurized containers provided with openings.

By the arrangement in series one behind the other according to the invention of the compression and straining zones, the washing results and the like obtained over comparatively short distances are so good that in addition, the construction length of the plant as compared to the known constructions can be considerably shortened without reducing the washing effect or the like. If the plant is operated with a treatment fluid under pressure instead of under vacuum, a significant saving in energy can be obtained in addition. According to the invention, the use of fresh treatment fluid is further considerably reduced.

According to the invention, the plant can be particularly short construction length in a further development if the belts with the material lodged therebetween are made to pass the zones with pressure from above and normal air pressure from below in approximately horizontal loops or undulations, at least one of these loops of the like being passed around a pressurized container or two or more of said loops or the like being passed singly around two ore more pressurized containers from below and over at least one reversing roller, compression roller, through press nips or the like arranged between these containers. The plant can be very short if the belts with the material are passed along the lateral walls of deep pressurized containers convexly bent towards the outside and provided in this area with openings for the discharge of the pressurized treatment fluid. Particularly if reduced construction height at significant shortening of the plant is sought, the embodiment can be so arranged that the belts with the material are passed along the bottoms for instance convexly curved downwards of flat pressurized containers provided with openings for the discharge of the pressurized treatment fluid in this area.

According to a further development of the invention, a particularly convenient practical embodiment is obtained by providing for the cross section of the pressurized containers to decrease, in particular constantly, from top to bottom and that advantageously, the container walls have the shape of a wedge cut off at the edge, optionally with curved flanges. In order to obtain a particular close control of the supply of treatment fluid, the pressurized containers have interior spaces advantageously divided approximately in the center and are closed in the lowermost, in particular flat portion. But is also, for instance, conceivable that the pressurized containers are provided with spaces for treatment fluid only within their flanges, which flanges are provided with the openings for the treatment fluid. In this case, the core space of the containers may be quite free of treatment fluid.

In practice, it may be particularly convenient and beneficial for the success of the treatment if the belts with the material lodged therebetween are made to pass in the area of the maxima and/or minima of the loops and undulations around optionally driven pressing reversing rollers, compression rollers or the like or through optionally driven press nips. The plant is preferably completed by providing in particular separate collection vats or the like for treatment fluid and washing fluid and the like underneath the lateral walls of the pressurized containers.

The endless permeable belts are for instance perforated steel belts or screen belts made of plastic material whose ends are connected in a suitable manner, for instance by means of welding, weaving or plugging.

By the arrangement according to the invention, an essentially improved and better controlled treatment of the material by means of the treatment medium is possible. As a result, as already mentioned, a better utilization of the treatment medium is possible, which in turn allows for an essentially more compact plant construction, for instance in the form of a treatment module in a conventional plant. Moreover, an essential reduction of the belt friction on flanges and bottoms of the treatment containers is obtained. With the arrangement according to the invention, there are further the possibilities of the combination of various treatment methods in one plant, with a sharper separation of the individual treatment zones than was possible before, and the regulation of the consistency of the material prior to treatment. Needless to say, a treatment is all the more effective the less fluid is carried along in the material to be treated, i.e. the degree of effect increases with the consistency. And finally, there is the possibility for an automatic temperature and/or pH control, in particular upstream of press nips.

The invention is explained by means of exemplary embodiments under reference to the accompanying drawing.

FIGS. 1, 3 and 4 show plants according to the invention with deep treatment containers in diagrammatic side view, FIGS. 3 and 4 being only partial side views;

FIG. 2 shows a modification of the embodiment according to FIG. 1 in detail;

FIG. 5 shows a machine with comparatively flat treatment containers and

FIG. 6 shows a detail of a variant thereof;

FIG. 7 shows a diagrammatic partial view of a further, particularly simple variant.

According to FIG. 1, the material 1, in particular in the form of a cake or web, is made to pass between the endless premeable belts 2 and 3 to the containers 4 to 6, the belts 2,3 with the material 1 being made to pass in undulations, loops or the like around these containers from underneath along their flanges 7 to 12 by means of the rollers 13 to 19. Further rollers 20 to 25 and 24' and 26 to 29 and 26' are provided for the return of the belts 2,3. As shown in partial view in FIG. 2, parts of rollers or press nips 30, 31 could be installed in the plant instead of the rollers 15,17 and 19. The stand construction supporting the containers, rollers and the like bears the reference number 32.

The flanges 7 to 12 of the containers are provided with openings through which the treatment fluid, in particular the washing fluid, is introduced under pressure to the belts and the material, as indicated by arrows 33 to 38. In the instant case, the treatment fluid is introduced into narrow containers 39 to 44.

It is important that the treatment or washing zones alternate at the perforates flanges 7 to 12 with interposed or flanking compression zones 13 to 19 and 30, 31 (rollers, compression rollers, press nips).

The treatment fluid passed or pressed through the belts and the material is collected in the containers 45 to 50 and reused if possible, in particular, it is pumped back into the containers 39 to 44.

In the double screen belt scrubber shown, the washing water is forced through the material 1 by means of containers (washing shoes) 7 to 12 more or less pressurized. The use of pressure is essentially more convenient from the viewpoint of energy consumption than the use of vacuum; moreover, at use of pressure, the friction of the belts 2,3 with the containers 7 to 12 is largely relieved by the penetrating resistance of the washing water through the material, while at use of vacuum, this friction is increased. The increased friction in vacuum screen belt washers moreover requires the use of special screens or metal belts.

As shown in the diagrammatic partial views of FIGS. 3 and 4, container shapes of approximately rectangular cross section 51 or of U-shaped cross section 52 are conceivable in addition to the approximately wedge-shaped containers shapes shown in FIG. 1, the container openings 53 being provided only on the container flanges in the one case, while openings 54 are also provided in the bottom, in the other case.

Reverting to FIG. 1, it is to be noted that the treated material, for instance the washed pulp, is discharged from the machine at 55.

By a vertical or oblique arrangement of the individual washing zones in the double screen belt washer, it is also easily possible to arrange a straining or squeezing zone consisting of a belt surface pressure 15, 17 or one or more S-shaped rollers or a nip pressure, i.e. one or more press nips, between each washing zone; this also applies to the embodiments according to FIGS. 3 and 4 where press nips 56, 57 and 58, 59 and compression rollers 60 are installed. By the combination of displacement washing and straining or squeezing, the total effect of the washing operation is increased and the requirement of fresh water (dilution factor) is reduced to a minimum. The reduction of the consumption of fresh water is of great economic significance for the evaporation plants for the washed pulp arranged downstream. The compact construction and reduced belt friction in the washing zones also create the possibility to provide further treatment containers and further treatment media, for instance bleaching chemicals, to be introduced into the material subsequent to the washing operation.

The dehydration of the material 1 starts in a pre-dehydration zone 61 on or at the returning length of the lower belt 3, Following the pre-dehydration zone, a dehydration shoe 62 is arranged to pre-dehydratrate the material 1 to about 10 to 40, in particular about 12 percent. Following this dehydration zone, there is one or there are more vertical treatment containers 63, 64 and 65, 66 or oblique treatment containers (washing shoes) 7 to 12, one or more reversing rollers or press nips being provided on each washing shoe or between the washing shoes. As already mentioned, the washing water is collected in further containers located underneath the washing zones and serving as pump rundown tanks for the charging of the individual washing zones in the countercurrent process. The treated material 1 is passed to a discharge means 67 on the discharge side.

It is possible to arrange one or more additional treatment zones which may be used after completion of the washing operation for the introduction of chemicals, for instance for bleaching the material.

As shown in FIG. 5, the treatment containers 68, 69 can also be formed with shallow depth, i.e. very flat and with only slightly curved bottoms 70, 71, the openings 72, 73 for the treatment fluid discharged under pressure being indicated by arrows and distributed over the entire bottom. On the container sides and between the containers 68, 69, there are again reversing rollers or compression rollers 74, 75, so that in this embodiment, as well, the belts with the material lodged therebetween are made to pass along an undulating path, namely through washing zones 70, 71 or the like and straining or squeezing zones 74, 75. The belts in this case bear the reference numbers 76 and 77.

As shown in partial view in FIG. 6, press nips 78, 79 can be provided in the compression zones. The material is designated by 80.

The pressure in the containers can be generated not only by means of pumps, but also statically, for instance by a column of treatment fluid of adequate height in the container and accordingly formed outflow opening.

In the representations shown, the treatment containers are arranged spacially at identical level and one behind the other in travel direction of the belts and the material. The containers according to FIG. 1 can have free interior spaces 81, 82 and 83, which reduces their weight. But it is also possible to provide interior spaces divided in the center from which the openings in the flanges are fed.

FIG. 7 shows diagrammtic detail of a further variant of the invention. From the pressurized containers 84, 85, washing fluid or the like—as indicated by arrows 86, 87—is forced under pressure through bottom openings through the horizontally passed upper belt 88 to the material 89, penetrates the material, flows on to the also horizontally passed lower belt 90 and is discharged from this on the underside, in particular largely pressureless, into the space underneath in which there is normal air pressure or atmospheric pressure or environmental pressure; such spaces can also be containers 91, 92 open on top. Essential are the straining zones following the superpressure zones 84, 85 and formed in this case by press nips 93, 94 and 95, 96. The successive superpressure and straining zones in concentrated space result in particularly good washing and treatment success.

We claim:

1. An apparatus for the treatment of a material including at least two endless permeable belts, means for moving said belts simultaneously, said belts being confronted for at least a portion of their path, means for lodging the material between the belts at the confronted portion of the path of said belts, at least two stationary treatment containers serving for the supply of a treatment medium, said treatment containers being spaced from each other and one behind the other horizontally in travel direction of the belts, a compression roller between said containers, the belts with the material being conveyed after individually passing a single treatment containers to the compression rollers between the containers, said containers being provided with inlets and outlets for various treatment media, the improvement to said treatment containers comprising: said treatment containers have a flat top, being provided with side walls defining openings; said containers being stationary with respect to said belts; said containers having at least one pressure zone within said containers at said sidewalls defining openings; means for supporting said containers only above said belts; means for conveying the belts with the material lodged therebetween exteriorly of said container adjacent to said pressure zone whereby pressurized treatment fluid is fed from the top to the belts and to the material from at least one of said containers by their side walls provided with openings, said sidewalls contacting and guiding the upper belt of said belts; said belts at said confronted portion of their path at said containers exposed to normal or atmospheric air pressure underneath the lower belt of said belts; straining zones on said confronted belts formed by pressing rollers arranged spatially from the pressure containers for straining said material between said confronted belts.

2. The apparatus according to claim 1 wherein the pressure containers have bottoms defining openings and wherein belts with the material lodged therebetween contact said bottoms provided with openings.

3. The apparatus according to claim 1 wherein the belts with the material lodged therebetween pass through the zones with pressure from above and normal air pressure from below in approximately horizontal undulations, at least two of said horizontal undulations individually passing around at least two stationary pressure containers from below and over at least one roller which is arranged between said containers.

4. The apparatus according to claim 1 wherein the pressure containers are deep and have outwardly curved sidewalls and the belts with the material lodged therebetween are passed along said outwardly curved sidewalls of the deep pressure containers.

5. The apparatus according to claim 1 wherein the pressure containers are shallow and have an entire downwardly curved wall and the belts with the material lodged therebetween are passed along said pressure containers extending in travel direction of the belts.

6. The apparatus according to claim 1 wherein said pressure containers have an equal size and an equal form.

7. The apparatus according to claim 1 wherein the pressure containers have the shape of a wedge being cut off at the edge and being provided with curved sidewalls.

8. An apparatus for the treatment of a material with at least two endless permeable belts, means for moving said belts simultaneously, said belts being confronted along a portion of their path; means for lodging the material between the belts at the confronted portion of the path of said belts; at least two containers serving for the supply of a treatment medium, said treatment containers being spaced from each other and one behind the other horizontally in travel direction of the belts, a compression roller between said containers, the belts with the material being conveyed after individually passing a single treatment containers to said compression roller between the containers, said containers being provided with inlets and outlets for various treatment media, the improvement in said treatment containers comprising: said treatment containers have a flat top, being provided with side walls, said side walls defining openings; said containers being stationarily arranged, said containers defining pressure containers having at least one pressure zone at said side walls defining said openings; said containers being arranged only above said belts; means for conveying the belts with the material lodged therebetween along the sidewall of said container by at least one pressure zone in which pressurized treatment fluid is fed from the top to the belts and through the material from at least one of said containers; said sidewalls contacting and guiding the upper belt of said belts; said container defining exteriorly thereof zones with atmospheric air pressure underneath the lower belt of said belts; pressing rollers supported between said containers; straining zones formed by said pressing rollers arranged spatially from the pressure containers; and means for supporting said stationary pressure containers at identical levels one behind the other.

9. The apparatus according to claim 8, wherein the pressure containers have the shape of a wedge being cut off at the edge and being provided with curved sidewalls.

10. The apparatus according to claim 8, wherein said pressure containers have an equal size and an equal form.

11. An apparatus for the treatment of a material comprising: at least two endless permeable belts; means for moving the belts simultaneously, said belts being confronted along at least a portion of their path; means for lodging the material between the belts at the confronted portion of the path of said belts; at least two containers serving for the supply of a treatment medium; means for supporting said treatment containers spaced apart from each other and one behind the other horizontally in travel direction of the belts; a compression roller between said containers; the belts with the material being conveyed after individually passing a single treatment containers passing to said compression roller between the containers; said containers defining inlets and outlets for various treatment media; said treatment containers have a flat top, sidewalls, said sidewalls defining openings; said containers being stationary with respect to said belts; said containers being constructed as pressure containers having at least one pressure zone at said container sidewalls defining said openings; said containers being arranged only above said belts; means for juxtaposing the belts with the material lodged therebetween along a sidewall of said stationary container whereby said belts are first conveyed through said at least one pressure zone in which pressurized treatment fluid is fed from the top to the belts and to the material from at least one of said containers by means of said side walls provided with openings; said sidewalls contacting and guiding the upper belt of said belts; said containers at said sidewalls defining zones with essentially normal or atmospheric air pressure underneath the lower belt of said belts; said belts as confronted made to pass through pressing rollers between said containers.

12. The apparatus according to claim 11, wherein said pressure containers have an equal size and an equal form.

13. The apparatus according to claim 11, wherein the pressure containers have the shape of a wedge being cut off at the edge and being provided with curved sidewalls.

14. The apparatus according to claim 11, wherein the pressure containers are provided with paired volumes for the treatment medium only within their side walls.

15. The apparatus according to claim 11, wherein the belts with the material lodged therebetween pass through the zones with pressure from above and normal air pressure from below in approximately horizontal indulations, said indulations having maxima and minima, the belts with the material lodged therebetween being passed in the area of the maxima and minima of the undulations around rollers.

16. The apparatus according to claim 1, wherein collecting means open on top for treatment medium are arranged underneath the side or lateral walls of the pressure containers.

17. An apparatus for the displacement washing of a filter cake comprising: at least two endless screen belts; means for moving said endless screen belts simultaneously, said endless screen belts being confronted along at least a portion of their path; means for lodging the filter cake between the belts after passing a compression zone; at least two containers serving the supply of a washing medium; means for supporting said treatment containers at identical levels above the belts, spaced from each other and one behind the other horizontally in travel direction of the belts; a compression roller between said containers; means for conveying the confronted belts with the filter cake to said compression roller between the containers; said containers defining inlets and outlets for washing fluids; said containers defining a flat top; said containers having sidewalls, said sidewalls defining openings; said containers being stationary with respect to said belts; said containers being constructed as pressure containers having at least one pressure zone registered to said sidewalls defining openings; said containers arranged only above said belts; means for conveying the belts with the filter cake lodged therebetween along the sidewalls of said containers by at least one pressure zone in which pressurized washing medium is fed from the top of the belts and to the filter cake from at least one of said stationary pressure containers through said sidewalls provided with openings; said sidewalls contacting and guiding the upper belts of said belts; said containers defining underneath the lower belt of said belt zones of atmospheric pressure, and; straining zones formed by pressing reversing rollers arranged spatially from the pressure containers.

18. The apparatus according to claim 17, wherein the pressure containers have bottoms, said bottoms define openings for releasing said treatment fluid; said belts with the filter cake lodged therebetween contacting said bottoms provided with openings.

19. The apparatus according to claim 17, wherein the belts with the filter cake lodged therebetween pass through the zones with pressure from above and normal air pressure from below in approximately horizontal undulations, with at least two of said horizontal undulations individually passing around at least two stationary pressure containers from below and over at least one reversing roller arranged between said containers.

20. The apparatus according to claim 17, wherein the pressure containers are deep and have convexedly outwardly curved sidewalls and the belts with the filter cake lodged therebetween are passed along said convexedly outwardly curved sidewalls of the deep pressure containers, said containers defining openings for the discharge of pressurized washing medium.

21. The apparatus according to claim 17, wherein the cross section of the stationary pressure containers arranged at identical levels one behind the other decreases constantly from top to bottom.

22. The apparatus according to claim 17, wherein the containers have the shape of a wedge being cut off at the edge and are provided with curved sidewalls.

23. The apparatus according to claim 17 wherein the pressure containers are provided with spaces for the washing medium only within their sidewalls, which walls are provided with the openings for the washing fluid.

24. The apparatus according to claim 17, wherein the belts with the filter cake lodged therebetween pass through the zones with pressure from above and normal air pressure from below in approximately horizontal undulations, said horizontal undulations having maxima and minima, the belts with the filter cake lodge therebetween being passed in the area of the maxima and minima of the horizontal undulations around pressing reversing rollers.

25. The apparatus according to claim 17, wherein said pressure containers have an equal size and an equal form.

* * * * *